United States Patent
Alexander, III et al.

(10) Patent No.: US 6,922,828 B1
(45) Date of Patent: Jul. 26, 2005

(54) METHOD AND SYSTEM FOR DETECTING COMMON BYTECODE SEQUENCES

(75) Inventors: William Preston Alexander, III, Austin, TX (US); Frank Eliot Levine, Austin, TX (US); Robert J. Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 09/393,082

(22) Filed: Sep. 9, 1999

Related U.S. Application Data

(63) Continuation-in-part of application No. 08/989,725, filed on Dec. 12, 1997, now Pat. No. 6,055,492.

(51) Int. Cl.$^7$ .................................................. G06F 9/45
(52) U.S. Cl. ........................ 717/144; 717/118; 717/132; 717/156
(58) Field of Search .................... 717/124, 106–119, 717/127–128, 130–133, 140–148, 151–158

(56) References Cited

U.S. PATENT DOCUMENTS

| | | | |
|---|---|---|---|
| 4,558,413 A | 12/1985 | Schmidt et al. | 364/300 |
| 5,295,230 A | 3/1994 | Kung | 395/75 |
| 5,321,834 A | 6/1994 | Weiser et al. | 395/600 |
| 5,465,258 A | 11/1995 | Adams | 395/700 |
| 5,481,712 A | 1/1996 | Silver et al. | 395/700 |
| 5,485,616 A | 1/1996 | Burke et al. | 395/700 |
| 5,493,689 A | 2/1996 | Waclawsky et al. | 395/821 |
| 5,506,955 A | 4/1996 | Chen et al. | 395/183.02 |
| 5,539,907 A | 7/1996 | Srivastava et al. | 395/700 |
| 5,553,235 A | 9/1996 | Chen et al. | 395/182.18 |
| 5,649,085 A | 7/1997 | Lehr | 395/140 |
| 5,689,712 A | 11/1997 | Heisch | 395/704 |
| 5,732,273 A | 3/1998 | Srivastava et al. | 395/704 |
| 5,737,609 A | 4/1998 | Reed et al. | 395/704 |
| 5,748,878 A | 5/1998 | Rees et al. | 395/183.14 |
| 5,768,500 A | 6/1998 | Agrawal et al. | 395/184.01 |
| 5,920,719 A * | 7/1999 | Sutton et al. | 717/4 |
| 6,055,492 A * | 4/2000 | Alexander, III et al. | 702/179 |

FOREIGN PATENT DOCUMENTS

| | | | | |
|---|---|---|---|---|
| JP | 02191017 | 10/1990 | | G06F/3/03 |
| JP | 4131921 | 8/1992 | | G06F/3/02 |
| JP | 10083326 | 5/1996 | | G06F/11/28 |

OTHER PUBLICATIONS

Hendren "Supporting Array Dependence Testing for an Optimizing/Parallelizing C compiler", Compiler Construction, 5$^{th}$ International Conference, CC' 94, Edinburgh, U.K. Apr. 7–9, 1994 Proceeding, pp. 309–323, 1994.*

Lambright, "Java Bytecode Optimizations", IEEE, pp. 206–210, 1997.*

(Continued)

Primary Examiner—Ted T. Vo
(74) Attorney, Agent, or Firm—Duke W. Yee; Jeffery S. Labaw; Stephen J. Walder, Jr.

(57) ABSTRACT

A method and system for detecting and counting bytecode sequences in a data processing system is provided. A bytecode tree data structure is used to represent sequences of bytecodes. A bytecode sequence is a subset of consecutive bytecodes within the set of bytecodes. The bytecode tree data structure contains a set of nodes in which each node represents a bytecode in a bytecode sequence or subsequence and in which a path through the bytecode tree data structure represents a bytecode sequence or subsequence. Each node of the bytecode tree data structure records one or more bytecode occurrence statistics for its corresponding bytecode in a set of bytecode sequences or subsequences. In order to determine the frequency of occurrence of common bytecode sequences and subsequences, a bytecode sequence tree data structure is generated from a set of bytecode sequences. The bytecode sequence tree data structure is then convolved into a bytecode subsequence occurrence tree data structure, which is a union of all subtrees of the bytecode sequence tree data structure.

24 Claims, 4 Drawing Sheets

OTHER PUBLICATIONS

Waddell et al., "Visualizing the Performance of Higher-Order Programs", ACM, pp.: 75–82, Jul. 1998.*

Lam et al., "A Tree Convolution Algorithm for The Solution of Queuing Networks", ACM, pp.: 203–215, Mar. 1983.*

International Business Machines Corporation; Technical Disclosure Bulletin vol. 38, No 11, Nov. 1995; Implementation of High Performance Subtype Object Migration.

International Business Machines Corporation; Technical Disclosure Bulletin vol. 21, No. 11, Apr. 1979; Method For Correlating Graphical Data On An Interactive Display.

Morrisett et al.; Abstract Models of Memory Management; Jun. 1995; pp. 66–77.

Reilly, M; Presentation Tools for Performance Visualization: the M31 Instrumentation Experience; Jan. 1990; pp 307–313.

Rich, SH et al.; Model-based Reasoning in Diagnostic Expert Systems for Chemical Process Plants; 1987; pp 111–122.

Three Form Editing; No. 30363; Jul. 1989.

A Technique for Sharing Data Among Elements of a Hierarchic Document; No. 28983; May 1988.

* cited by examiner

FIG. 8A

| FREQ | BCODE |
|---|---|
| 1 | root |
| 1 | -a |
| 1 | --b |
| 1 | ---c |
| 1 | ----a |
| 1 | -----b |

FIG. 8B

| FREQ | BCODE |
|---|---|
| 2 | root |
| 2 | -a |
| 2 | --b |
| 2 | ---c |
| 1 | ----a |
| 1 | -----b |
| 1 | ---d |
| 1 | ----a |
| 1 | -----b |

FIG. 8C

| FREQ | BCODE |
|---|---|
| 4 | root |
| 4 | -a |
| 4 | --b |
| 3 | ---c |
| 2 | ----a |
| 2 | -----b |
| 1 | ---d |
| 1 | ----a |
| 1 | -----b |

FIG. 8D

| LV | FREQ | BCODE |
|---|---|---|
| 0 | 20 | root |
| 1 | 7 | -a |
| 2 | 7 | --b |
| 3 | 3 | ---c |
| 4 | 2 | ----a |
| 5 | 2 | -----b |
| 3 | 1 | ---d |
| 4 | 1 | ----a |
| 5 | 1 | -----b |
| 1 | 7 | -b |
| 2 | 3 | --c |
| 3 | 2 | ---a |
| 4 | 2 | ----b |
| 2 | 1 | --d |
| 3 | 1 | ---a |
| 4 | 1 | ----b |
| 1 | 3 | -c |
| 2 | 2 | --a |
| 3 | 2 | ---b |
| 1 | 1 | -d |
| 2 | 1 | --a |
| 3 | 1 | ---b |

METHOD AND SYSTEM FOR DETECTING COMMON BYTECODE SEQUENCES

CROSS-REFERENCE TO RELATED APPLICATIONS

This application is a continuation-in-part of the following copending and commonly assigned application entitled "SYSTEM AND METHOD FOR PROVIDING TRACE INFORMATION REDUCTION", U.S. application Ser. No. 08/989,725, filed on Dec. 12, 1997, currently pending now, U.S. Pat. No. 6,055,492.

BACKGROUND OF THE INVENTION

1. Technical Field

The present invention relates to an improved data processing system and, in particular, to a method and system for optimizing performance in a data processing system. Still more particularly, the present invention provides a method and system for a software program development tool for detecting and counting common bytecode sequences in a set of compilable bytecodes.

2. Description of Related Art

Because Java is an interpreted language, any programs written in Java, after being converted into Java class files, are interpreted by a Java virtual machine (JVM). In order to improve performance, many JVMs may compile Java classes into platform-specific binary code after they are loaded into the JVM. Then, instead of being interpreted, Java classes are executed in their compiled native code format, similar to programs written in other languages, such as C, C++, etc. Such just-in-time (JIT) compilation of Java programs can significantly improve the speed of execution of Java programs.

The just-in-time compilation time becomes part of the execution time of a Java program. For a given Java class method, JIT compilation can be justified only if the compiled method code executes in less time than the JIT compilation time for the method. Otherwise, the method should be executed by interpreting the method's bytecodes. For typical Java applications, there are many class methods which are only rarely invoked, making JIT compilation of such methods unjustified.

In advanced JVM implementations, JIT compilers compile Java methods selectively, depending upon the satisfaction of certain criteria. This so-called "hot-spot compiling" is a hybrid of interpretation and just-in-time compilation that attempts to combine both techniques in order to yield Java programs that run as fast as natively compiled code. This type of execution may be performed by an interpreter in the execution engine called a "mixed mode interpreter." A mixed-mode interpreter attempts to analyze or profile the program in order to determine the locations of the program that justify the time expense for compiling a portion of the program.

The usual approach to optimization is to profile the program in a temporal dimension to discover exactly where the program spends most of its time and then spend time optimizing portions of the program which execute most often. In this approach, the JVM begins the execution of the program by interpreting the program. As the JVM interprets the program's bytecodes, it analyzes the execution of the program to determine the program's "hot spots," which is the part of the program where the program spends most of its time. When it identifies a hot spot, the JVM just-in-time compiles only the portion of the code that encompasses the hot spot. Rather than, or in addition to, profiling the program in a temporal dimension, the program may also be analyzed in a spatial dimension to discover the bytecodes sequences which constitute the program. The optimization effort may then be directed to the most common bytecode sequences that appear within the program. However, analyzing a program to find common bytecode sequences is especially time intensive.

Designers of JIT compilers must trade off the time spent optimizing a bytecode sequence against the runtime gain from making that sequence faster. If analysis of many different Java programs reveals that certain bytecode sequences are frequently executed in many different programs, then the JIT compiler designers and implementers can program the JIT compiler to always apply their best optimizations to these sequences without any runtime profiling. However, a moderate-sized Java program may executed millions of different bytecode sequences, and there are many programs to analyze.

Therefore, it would be particularly advantageous to provide a high performance method and system for detecting and counting bytecode sequences.

SUMMARY OF THE INVENTION

A method and system for detecting and counting bytecode sequences in a data processing system is provided. A bytecode tree data structure is used to represent sequences of bytecodes. A bytecode sequence is a subset of consecutive bytecodes within the set of bytecodes. The bytecode tree data structure contains a set of nodes in which each node represents a bytecode in a bytecode sequence or subsequence and in which a path through the bytecode tree data structure represents a bytecode sequence or subsequence. Each node of the bytecode tree data structure records one or more bytecode occurrence statistics for its corresponding bytecode in a set of bytecode sequences or subsequences. In order to determine the frequency of occurrence of common bytecode sequences and subsequences, a bytecode sequence tree data structure is generated from a set of bytecode sequences. The bytecode sequence tree data structure is then convolved into a bytecode subsequence occurrence tree data structure, which is a union of all subtrees of the bytecode sequence tree data structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 8A–8D depict a set of examples of bytecode sequence trees and a bytecode sequence occurrence tree.

DETAILED DESCRIPTION OF THE PREFERRED EMBODIMENT

Figure 1:
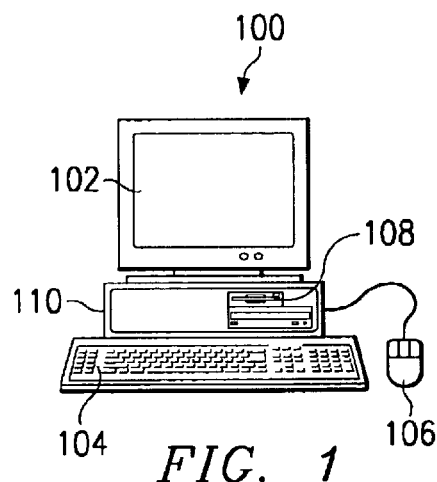
FIG. 1 depicts a general data processing system in which the present invention may be implemented.

With reference now to FIG. 1, a pictorial representation depicts a data processing system in which the present invention may be implemented in accordance with a preferred embodiment of the present invention. A personal computer 100 is depicted, which includes a system unit 110, a video display terminal 102, a keyboard 104, storage devices 108, which may include floppy drives and other types of permanent and removable storage media, and mouse 106. Additional input devices may be included with personal computer 100. Personal computer 100 can be implemented using any suitable computer, such as an IBM Aptiva™ computer, a product of International Business Machines Corporation, located in Armonk, N.Y. Although the depicted representation shows a personal computer, other embodiments of the present invention may be implemented in other types of data processing systems, such as network computers, Web based television set top boxes, Internet appliances, etc. Computer 100 also preferably includes a graphical user interface that may be implemented by means of system software residing in computer readable media in operation within computer 100.

Figure 2:
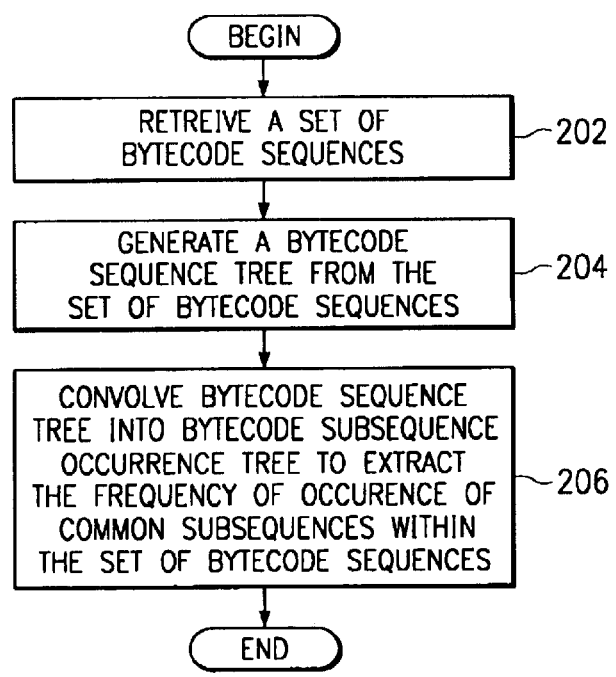
FIG. 2 is a flowchart depicting a method for detecting common bytecode sequences in accordance with a preferred embodiment of the present invention.

With reference now to FIG. 2, a flowchart depicts a method for detecting common bytecode sequences in accordance with a preferred embodiment of the present invention. The process begins by retrieving a set of bytecode sequences (step 202). A bytecode sequence tree is then generated from the set of bytecode sequences (step 204). The process then "convolves" the bytecode sequence tree into a bytecode subsequence occurrence tree to extract the frequency of occurrences of common subsequences within the set of bytecode sequences (step 206). The process is then completed.

The general approach provided by the present invention first requires the generation of a tree database from a collection of bytecode sequences. A bytecode sequence is defined as some number of consecutive bytecodes that have a demarcated boundary (beginning and/or end), e.g., a series of bytecodes that terminate at a particular point and begin a next sequence at the following bytecode, such as a method call bytecode. The second major step then convolves the tree to obtain the frequency of occurrence of common subsequences. "Convolving" a tree is defined as traversing a first tree to create a second tree which contains the union of all subtrees of the first tree. These two steps, i.e. generating a bytecode sequence tree and convolving the bytecode sequence tree, are explained in more detail further below.

Figure 3:
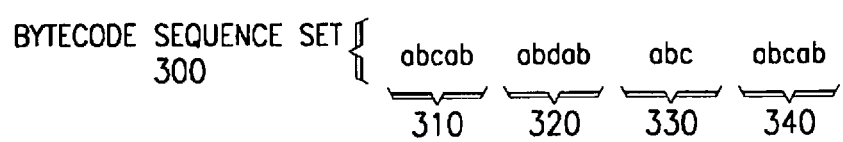
FIG. 3 depicts a set of exemplary bytecode sequences.

With reference now to FIG. 3, a set of exemplary bytecode sequences is depicted. Set 300 contains bytecode sequences 310–340. Each string of letters in the figure represents an abstract bytecode sequence, and each letter within the string of letters represents a single bytecode. Notice that sequence 310 is identical to sequence 340, and that there are common subsequences such as 'abc'. It is useful to identify freqently-occurring sequences and subsequences such as these.

Figures 4, 5:
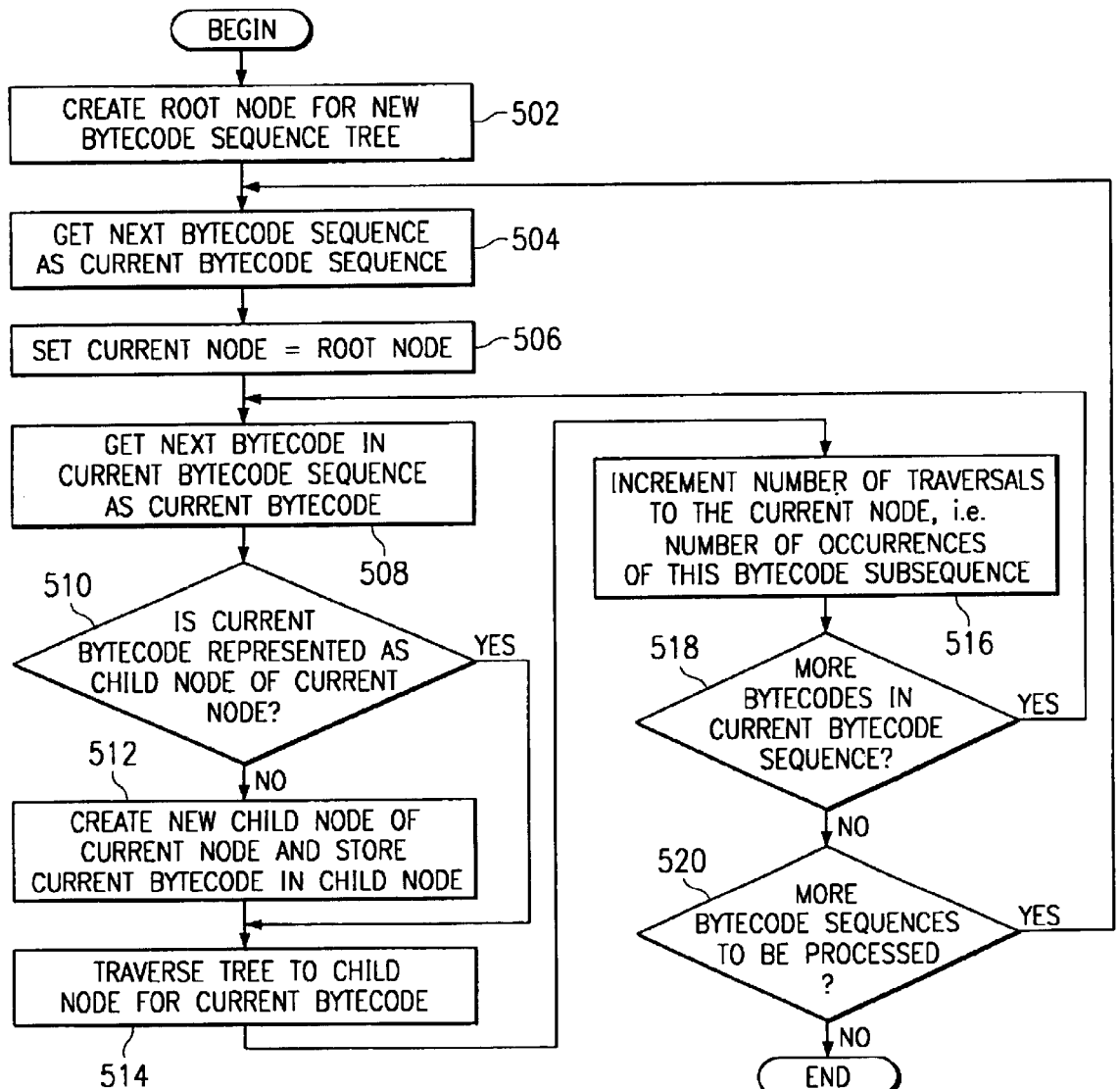
FIG. 4 depicts a prior art approach to detecting common sequences.
FIG. 5 is a flowchart depicting a method for generating a bytecode sequence tree.

With reference now to FIG. 4, a prior art approach to detecting common sequences is depicted. The method attempts to simply enumerate each possible substring within each bytecode sequence. For bytecode sequence 310 shown in FIG. 3, the subsequences depicted in FIG. 4 are developed. Subsequences 400 show each possible subsequence of bytecodes within bytecode sequence 310. Subsequence frequency 402 depicts the frequency that a subsequence in subsequences 400 occurs within bytecode sequence 310. By similarly proceeding through all bytecode sequences in bytecode sequence set 300, the occurrences of all subsequences may be totaled to obtain a final result of the frequency of all subsequences within bytecode sequence set 300. However, as the number of sequences and the length of sequences increases, the amount of time and memory required to determine whether a subsequence has already been analyzed significantly increases because the number of subsequences that must be searched and compared also significantly increases. The present invention does not incur the same time and memory requirements of the method shown in FIG. 4 and is, therefore, faster and more efficient at detecting common bytecode sequences.

With reference now to FIG. 5, a flowchart depicts a method for generating a bytecode sequence tree. The process begins by creating a root node for a new bytecode sequence tree (step 502). The next bytecode sequence in the set of bytecode sequences to be processed is then obtained as a current bytecode sequence (step 504). The current node is then set equal to the root node (step 506).

The next bytecode in the current bytecode sequence is then retrieved as a current bytecode (step 508). A determination is then made as to whether the current bytecode is represented as a child node of the current node (step 510). If not, then a new child node of the current node is created and the current bytecode is stored in the child node (step 512). After the creation of the new child node, or if a child node for the current bytecode already existed, then the bytecode sequence tree is traversed to the child node corresponding to the current bytecode (step 514). The number of traversals to the current node is then incremented (step 516). In other words, the number of occurrences of this bytecode subsequence is incremented each time the current node is reached during the processing of a bytecode in the set of bytecode sequences.

A determination is then made as to whether there are more bytecodes in the current bytecode sequence to be processed (step 518). If so, then the process branches back to step 508 to obtain and process another bytecode. If there are no other bytecodes in the current bytecode sequence, then a determination is made as to whether there are more bytecode sequences to be processed (step 520). If so, then the process branches back to step 504 to process another bytecode sequence. If there are no other bytecode sequences to be processed, the process is then complete with respect to generating a bytecode sequence tree.

Figure 6:
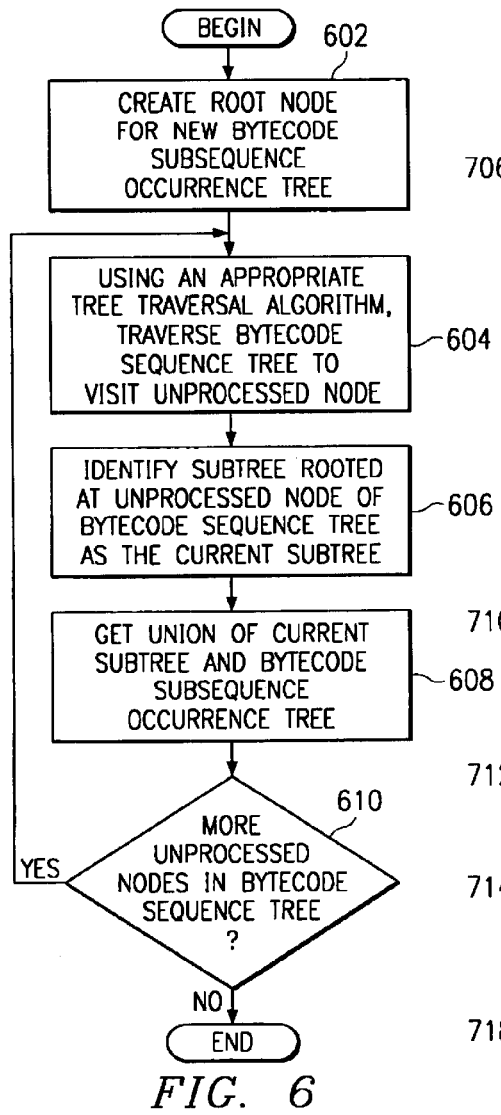
FIG. 6 is a flowchart depicting a process for convolving a bytecode sequence tree.

With reference now to FIG. 6, a flowchart depicts a process for convolving a bytecode sequence tree. The process begins by creating a root node for the new bytecode subsequence occurrence tree (step 602). Using an appropriate tree traversal algorithm, the bytecode sequence tree is then traversed to visit an unprocessed node (step 604). In other words, each node within the bytecode sequence tree is processed once. Various algorithms may be used to walk the tree structure, such as pre-order traversal, in-order traversal, post-order traversal, etc.

The subtree rooted at the unprocessed node of the bytecode sequence tree is then identified as a current subtree (step 606). The current subtree is then "added" to the bytecode subsequence occurrence tree to get a union of the current subtree and the bytecode subsequence occurrence tree (step 608). A determination is then made as to whether there are other unprocessed nodes in the bytecode sequence tree (step 610). If so, then the process branches back to 604 to process another node in the bytecode sequence tree. If there are no other unprocessed nodes, the process completes with respect to the step of convolving the bytecode sequence tree.

Figure 7:
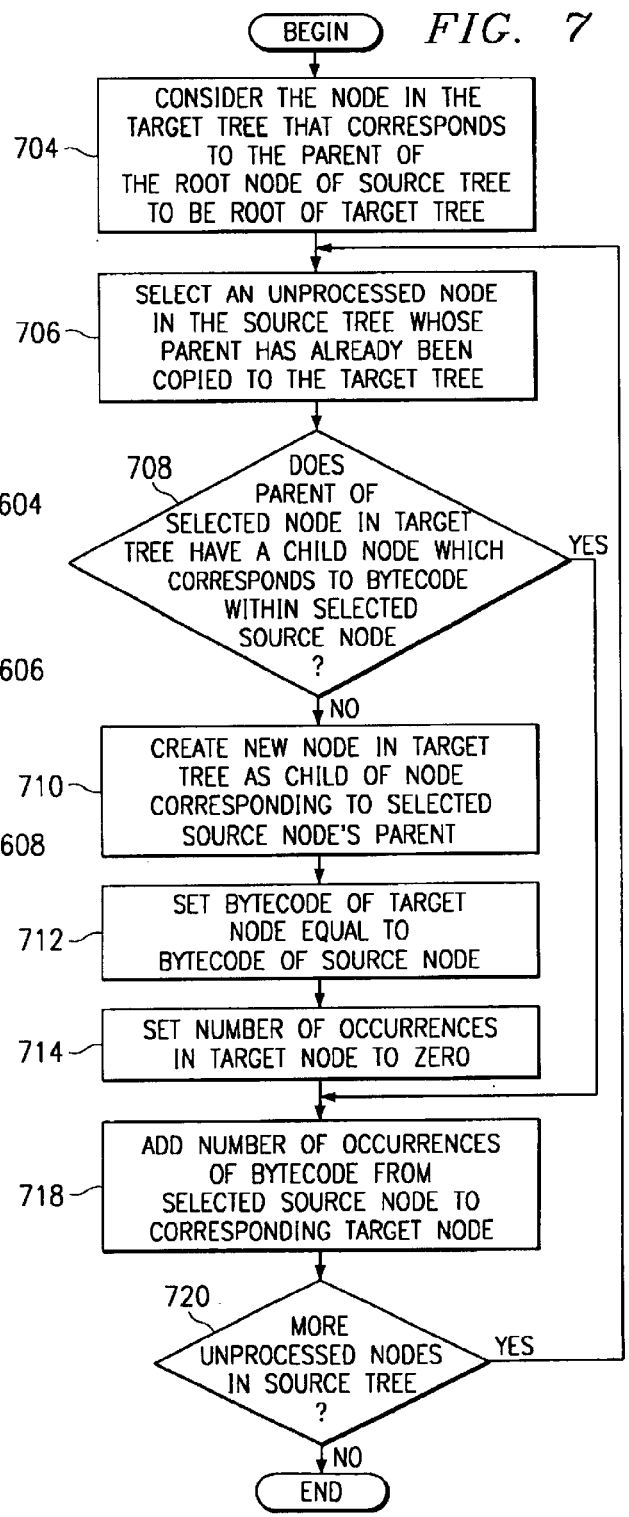
FIG. 7 is a flowchart depicting the process by which a first tree is added to a second tree to obtain a union between the two trees.

With reference now to FIG. 7, a flowchart depicts the process by which one tree, called the source tree, is added to a second tree, called the target tree, to obtain a union between the two trees. This process implements step 608 in FIG. 6. The intent is to copy the source tree into the target tree starting from the root of the target tree. In order to insure that each unique substring is represented only once in the bytecode subsequence tree, if any part of the source tree starting at its root already exists in the target tree as a child of its root, then the existing nodes in the target tree must be reused, increasing their frequency counts, instead of creating new, duplicate nodes in the target tree.

Each source tree node, S, has a unique parent node, par(S) in the source tree by the definition of "tree", except for the root node, $S_{root}$, which has no parent. Also each S will eventually have a unique corresponding node T(S) in the target tree. Each S is copied to the target tree as a child of its parent's unique corresponding node in the target tree. In other words, if $S_1$ is a child of $S_2$ then $T(S_1)$ will be a child of $T(S_2)$. Thus, par(S) must have been copied into the target tree before S can be copied. However, to get the copying process started, this requirement is waived for the root of the source tree; assume $T(par(S_{root}))$ is the root of the target tree (step 704).

Any node S from the source tree whose parent has already been copied to the target tree can be selected as the next node to be copied (step 706). A determination is then made as to whether T(par(S)) already has a child node representing the same bytecode as S (step 708). If not, a new child node is created in the target tree (step 710), the bytecode of the new node is set to the bytecode of S (step 712), and the number of occurrences in the target node is set to zero (step 714). The number of occurrences of the bytecode in S is then added to the occurrence value stored in its corresponding node T(S) (whether newly created or pre-existing) in the target tree (step 718).

A determination is then made as to whether there are any remaining uncopied nodes in the source tree (step 720). If so, then the process branches back to 706 where another node is selected to be copied. If not, the process is complete.

In this manner, a bytecode sequence tree is "walked" to identify unique subtrees within the bytecode sequence tree. Each of these subtrees are then added to the bytecode subsequence occurrence tree to obtain a count of all possible subsequences within the set of sequences that were used to create the bytecode sequence tree.

With reference now to FIGS. 8A–8D, a set of examples of bytecode sequence trees and a bytecode sequence occurrence tree are depicted. The examples shown in FIGS. 8A–8D depict the application of the processes described in FIGS. 5–7 to the set of sequences shown in FIG. 3. FIG. 8A shows a bytecode sequence tree after bytecode sequence 310 has been processed. The column BCODE contains bytecodes in a tree format. The first entry depicts the root node for the bytecode sequence tree. The indentation of the bytecodes in subsequent entries of the table denotes the level or position of the particular bytecode in a subsequence. The column FREQ shows the frequency of the occurrence of a bytecode subsequence tracing the path from the root to a particular bytecode.

FIG. 8B depicts the state of the bytecode sequence tree shown in FIG. 8A after processing bytecode sequence 320 shown in FIG. 3. FIG. 8C shows the state of the bytecode sequence tree from FIG. 8B after processing bytecode sequences 330 and 340 shown in FIG. 3. In other words, FIG. 8C depicts the bytecode sequence tree after processing all of the bytecode sequences shown in FIG. 3.

FIG. 8D depicts a bytecode subsequence occurrence tree that has the bytecode sequence tree shown in FIG. 8C as its input to the convolving process. As can be seen, the first few entries in FIG. 8D show that there were seven occurrences of the subsequence "AB" but only three occurrences of the sequence "ABC." The column LV shows the level within the bytecode subsequence occurrence tree of each particular bytecode.

Alternatively, other preprocessing steps may be performed before the bytecode sequence tree is constructed. For example, the set of bytecode sequences may be scanned to discard bytecode sequences that exceed a predetermined maximum length threshold. This would prevent significant amounts of time from being spent to process sparse portions of the bytecode sequence tree that were created during the processing of very long bytecode sequences. Another preprocessing step that may be performed would be to create a histogram of the bytecode sequences before processing the bytecode sequences into the bytecode sequence tree. Thus, for each unique bytecode sequence, the bytecode sequence is only processed into the bytecode sequence tree once. The number of occurrences of the bytecode could then be multiplied by the frequency of the bytecode sequence as determined within the histogram of the bytecode sequences.

The advantages of the present invention are apparent in view of the detailed description provided above. Depending upon the end-user application, various scanning techniques may then be used on a bytecode subsequence occurrence tree to derive useful information. For example, in the case of detecting commonly occurring bytecode sequences, the end result is the identification of bytecode sequences that appear to be prime candidates for just-in-time compiler optimization. The ultimate metric for the success in identifying commonly occurring bytecode sequences would then be an improvement in the performance of the execution of an application program in the Java runtime environment.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system, the method comprising the computer-implemented steps of:

generating a bytecode sequence tree data structure from a set of bytecode sequences; and convolving the bytecode sequence tree data structure into a bytecode subsequence occurrence tree data structure.

2. The method of claim 1 wherein a bytecode sequence tree data structure comprises a set of nodes, wherein each node represents a bytecode in a bytecode sequence.

3. The method of claim 1 wherein a path through the bytecode sequence tree data structure represents a bytecode sequence unique to all paths in the bytecode sequence tree data structure.

4. The method of claim 1 wherein the step of generating a bytecode sequence tree data structure comprises:

determining whether a node in the bytecode sequence tree data structure represents a selected bytecode;

in response to a determination that the selected bytecode is not represented by a node in the bytecode sequence tree data structure, adding to the bytecode sequence tree data structure a new node representing the selected bytecode, wherein the new node is a child node descending from a parent node representing an immediately preceding bytecode in a bytecode sequence of the selected bytecode; and incrementing, in the node in the bytecode sequence tree data structure representing the selected bytecode, a count of occurrences of the selected bytecode.

5. The method of claim 1 wherein the step of convolving the bytecode sequence tree data structure into a bytecode subsequence occurrence tree data structure comprises:

creating a root node for the bytecode subsequence occurrence tree data structure;

traversing the bytecode sequence tree data structure to visit each node of the bytecode sequence tree data structure, wherein each visited node determines a subtree data structure of the bytecode sequence tree data structure rooted at the visited node; and for each visited node of the bytecode sequence tree data structure, adding the subtree data structure for the visited node to the bytecode subsequence occurrence tree data structure at a subtree rooted at a root node of the bytecode subsequence occurrence tree data structure.

6. The method of claim 1 wherein the bytecode subsequence occurrence tree data structure comprises a union of all subtree data structures of the bytecode sequence tree data structure.

7. The method of claim 1 wherein a path through the bytecode subsequence occurrence tree data structure represents a bytecode sequence unique to all paths in the bytecode subsequence occurrence tree data structure.

8. The method of claim 1 wherein the bytecodes are Java bytecodes.

9. The method of claim 1 wherein a bytecode sequence is a subset of consecutive bytecodes within a set of bytecodes.

10. The method of claim 9 wherein the set of bytecodes comprises demarcating bytecodes that may be interpreted as marking a boundary of a bytecode sequence.

11. A data processing system comprising:

generation means for generating a bytecode sequence tree data structure from a set of bytecode sequences; and convolution means for convolving the bytecode sequence tree data structure into a bytecode subsequence occurrence tree data structure.

12. The data processing system of claim 11 wherein a bytecode sequence tree data structure comprises a set of nodes, wherein each node represents a bytecode in a bytecode sequence.

13. The data processing system of claim 11 wherein a path through the bytecode sequence tree data structure represents a bytecode sequence unique to all paths in the bytecode sequence tree data structure.

14. The data processing system of claim 11 wherein the generations means for generating a bytecode sequence tree data structure comprises:

determining means for determining whether a node in the bytecode sequence tree data structure represents a selected bytecode;

adding means for adding, in response to a determination that the selected bytecode is not represented by a node in the bytecode sequence tree data structure, to the bytecode sequence tree data structure a new node representing the selected bytecode, wherein the new node is a child node descending from a parent node representing an immediately preceding bytecode in a bytecode sequence of the selected bytecode; and incrementing means for incrementing, in the node in the bytecode sequence tree data structure representing the selected bytecode, a count of occurrences of the selected bytecode.

15. The data processing system of claim 11 wherein the convolution means for convolving the bytecode sequence tree data structure into a bytecode subsequence occurrence tree data structure comprises:

creation means for creating a root node for the bytecode subsequence occurrence tree data structure;

traversing means for traversing the bytecode sequence tree data structure to visit each node of the bytecode sequence tree data structure, wherein each visited node determines a subtree data structure of the bytecode sequence tree data structure rooted at the visited node; and adding means for adding, for each visited node of the bytecode sequence tree data structure, the subtree data structure for the visited node to the bytecode subsequence occurrence tree data structure.

16. The data processing system of claim 11 wherein the bytecode subsequence occurrence tree data structure comprises a union of all subtrees of the bytecode sequence tree data structure.

17. The data processing system of claim 11 wherein a path through the bytecode subsequence occurrence tree data structure represents a bytecode sequence unique to all paths in the bytecode subsequence occurrence tree data structure.

18. The data processing system of claim 11 wherein the bytecodes are Java bytecodes.

19. The data processing system of claim 11 wherein a bytecode sequence is a subset of consecutive bytecodes within a set of bytecodes.

20. The data processing system of claim 19 wherein the set of bytecodes comprises demarcating bytecodes that may be interpreted as marking a boundary of a bytecode sequence.

21. A computer program product in a computer-readable medium for use in a data processing system, the computer program product comprising:

first instructions for generating a bytecode sequence tree data structure from a set of bytecode sequences; and second instructions for convolving the bytecode sequence tree data structure into a bytecode subsequence occurrence tree data structure.

22. The computer program product of claim 21 wherein the first instructions for generating a bytecode sequence tree data structure further comprise:

instructions for determining whether a node in the bytecode sequence tree data structure represents a selected bytecode;

instructions for adding, in response to a determination that the selected bytecode is not represented by a node in the bytecode sequence tree data structure, to the bytecode sequence tree data structure a new node representing the selected bytecode, wherein the new node is a child node descending from a parent node representing an immediately preceding bytecode in a bytecode sequence of the selected bytecode; and instructions for incrementing, in the node in the bytecode sequence tree data structure representing the selected bytecode, a count of occurrences of the selected bytecode.

23. The computer program product of claim 21 wherein the second instructions for convolving the bytecode sequence tree data structure into a bytecode subsequence occurrence tree data structure comprises:

creating a root node for the bytecode subsequence occurrence tree data structure;

traversing the bytecode sequence tree data structure to visit each node of the bytecode sequence tree data structure, wherein each visited node determines a subtree data structure of the bytecode sequence tree data structure rooted at the visited node; and for each visited node of the bytecode sequence tree, adding the subtree data structure for the visited node to the bytecode subsequence occurrence tree data structure.

24. The computer program product of claim 21 wherein the bytecode subsequence occurrence tree data structure comprises a union of all subtrees of the bytecode sequence tree data structure.

* * * * *

UNITED STATES PATENT AND TRADEMARK OFFICE
CERTIFICATE OF CORRECTION

| | | |
|---|---|---|
| PATENT NO. | : 6,922,828 B1 | Page 1 of 1 |
| APPLICATION NO. | : 09/393082 | |
| DATED | : July 26, 2005 | |
| INVENTOR(S) | : Alexander, III et al. | |

It is certified that error appears in the above-identified patent and that said Letters Patent is hereby corrected as shown below:

On Title page
(item)(74) Attorney, Agent, or Firm: delete "Jeffrey S. Labaw" and insert
– Jeffrey S. LaBaw–.

Signed and Sealed this

Twenty-ninth Day of August, 2006

JON W. DUDAS
*Director of the United States Patent and Trademark Office*